United States Patent
Neumiller et al.

(10) Patent No.: US 7,356,740 B2
(45) Date of Patent: Apr. 8, 2008

(54) HAZARD MITIGATION IN MEDICAL DEVICE

(75) Inventors: James S. Neumiller, Redmond, WA (US); Gary A. DeBardi, Kirkland, WA (US); Patrick F. Kelly, Edmonds, WA (US)

(73) Assignee: MedTronic Physio-Control Corp., Redmond, WA (US)

(*) Notice: Subject to any disclaimer, the term of this patent is extended or adjusted under 35 U.S.C. 154(b) by 8 days.

(21) Appl. No.: 11/251,716

(22) Filed: Oct. 17, 2005

(65) Prior Publication Data

US 2006/0036914 A1 Feb. 16, 2006

Related U.S. Application Data

(63) Continuation of application No. 10/056,554, filed on Jan. 23, 2002, now Pat. No. 6,957,368.

(51) Int. Cl.
*G06F 11/00* (2006.01)

(52) U.S. Cl. .......................................... 714/55

(58) Field of Classification Search ............. 714/23, 714/55, 56, 57, 48, 32; 607/4, 5, 148
See application file for complete search history.

(56) References Cited

U.S. PATENT DOCUMENTS

| | | | |
|---|---|---|---|
| 4,586,179 A * | 4/1986 | Sirazi et al. ............. 714/22 |
| 4,618,953 A * | 10/1986 | Daniels et al. ............. 714/23 |
| 5,113,869 A | 5/1992 | Nappholz et al. |
| 5,342,403 A | 8/1994 | Powers et al. |
| 5,463,555 A * | 10/1995 | Ward et al. ............. 700/96 |
| 5,571,141 A | 11/1996 | McNeil et al. |
| 5,746,203 A * | 5/1998 | Hood, Jr. ............. 600/300 |
| 5,800,460 A | 9/1998 | Powers et al. |
| 5,879,374 A | 3/1999 | Powers et al. |
| 5,919,212 A * | 7/1999 | Olson et al. ............. 607/5 |
| 5,931,791 A | 8/1999 | Saltzstein et al. |
| 6,014,587 A | 1/2000 | Shaw et al. |
| 6,115,636 A | 9/2000 | Ryan |
| 6,301,502 B1 | 10/2001 | Owen et al. |
| 6,304,780 B1 | 10/2001 | Owen et al. |
| 6,463,555 B2 | 10/2002 | Nitschke et al. |
| 6,820,221 B2 | 11/2004 | Fleming |
| 6,957,368 B2 | 10/2005 | Neumiller et al. |

* cited by examiner

*Primary Examiner*—Nadeem Iqbal
(74) *Attorney, Agent, or Firm*—Shumaker & Sieffert

(57) ABSTRACT

Delivery of energy by a defibrillator or other medical device is inhibited when the processor or software that controls a module of the medical device operates abnormally. A windowed watchdog timer (WWDT) incorporated into one module of the medical device is used to control the operation of other modules of the medical device via a software-based extension technique. As a result, the risk of harm to the patient is reduced compared to medical devices that incorporate over-limit type watchdog timers. In addition, costs associated with implementing WWDTs in multiple modules of the defibrillator are avoided, thereby lowering the overall cost of implementation.

27 Claims, 3 Drawing Sheets

HAZARD MITIGATION IN MEDICAL DEVICE

This application is a continuation of U.S. patent application Ser. No. 10/056,554, filed Jan. 23, 2002 now U.S. Pat. No. 6,957,368, the entire content of which is incorporated herein by reference.

TECHNICAL FIELD

The invention relates generally to medical devices and, more specifically, to safety features in such devices.

BACKGROUND

Ventricular fibrillation and atrial fibrillation are common and dangerous medical conditions that cause the electrical activity of the human heart to become unsynchronized. Loss of synchronization may impair the natural ability of the heart to contract and pump blood throughout the body. Medical personnel treat fibrillation by using a defibrillator system to apply a relatively large electrical charge to the heart via defibrillator electrodes. If successful, the charge overcomes the unsynchronized electrical activity and gives the natural pacing function of the heart an opportunity to recapture the heart and reestablish a normal sinus rhythm.

Some defibrillator systems incorporate a number of functional modules. These modules may include, for example, a therapy module that controls the defibrillator electrodes, a user interface module that receives input and presents output to medical personnel, and a patient parameters module that obtains information from the patient. Each module typically incorporates an embedded microprocessor that executes software for controlling the operation of the module.

Abnormal operation of the embedded microprocessor or software that controls a module can be hazardous to the patient. For example, a malfunction in the user interface module may cause the defibrillator to deliver electrical shocks to the patient when no therapy was requested by an operator. Inappropriately delivered shocks can be painful or harmful to the patient.

To reduce the risk of abnormal processor or software operation, some defibrillators incorporate a conventional watchdog timer that resets the processor in a module if the processor functions abnormally. The watchdog timer requires a handshake from the processor at a prescribed time to validate proper operation of the processor. The processor contains a watchdog timer process manager that verifies that the expected processes have performed normally by examining whether the processes have properly "checked in" during a particular time interval and, if so, outputs a handshake signal to the watchdog timer. If the watchdog timer does not detect the handshake signal within the prescribed time, the watchdog timer places the processor in a reset state to reinitialize the processor to a known safe state and inhibits the therapy module from inadvertently delivering an electrical shock to the patient via the defibrillator electrodes.

The watchdog timer is typically implemented as an over-limit watchdog timer that resets the processor after a maximum prescribed time has elapsed without a handshake from the watchdog timer process manager. While this approach improves the reliability of the defibrillator, some safety guidelines require an additional degree of hazard mitigation. For example, the *Technischer Überwachungsverein* (TUV) (Technical Inspection Association) safety guidelines require the use of a windowed watchdog timer (WWDT) that resets the processor not only after a maximum elapsed time without a handshake, but also after receiving a handshake before a minimum elapsed time.

SUMMARY

In general, the invention promotes safe operation of defibrillators and other medical devices that deliver energy to a patient by inhibiting energy delivery when the processor or software that controls a module operates abnormally. In some implementations, a windowed watchdog timer (WWDT) incorporated into one module of a defibrillator is used in controlling the operation of other modules of the defibrillator. A software-based "extension" technique may be used to leverage a single WWDT across multiple embedded processors, thereby avoiding the need to incorporate a dedicated WWDT in each embedded processor.

The invention may offer several advantages. For instance, the use of a WWDT to control defibrillator operation offers a greater degree of hazard mitigation than is offered by over-limit type watchdog timers. In addition, by using a single WWDT to inhibit defibrillator operation, costs associated with implementing WWDTs in multiple modules of the defibrillator are avoided, thereby lowering the overall cost of implementation.

One embodiment is directed to a method for leveraging a WWDT across multiple modules of a medical device. A handshake signal is generated in a first processor of a medical device and provided to a second processor of the medical device. The second processor resets the first processor when the handshake signal is not provided within a prescribed time interval.

Other implementations include medical devices that carry out these methods, as well as processor-readable media containing instructions that cause a processor within a defibrillator to perform these methods. For example, in one embodiment, a medical device includes a first functional module having a first embedded processor that generates a watchdog signal. A second functional module has a second embedded processor that receives the watchdog signal and resets when the watchdog signal is not provided within a prescribed time interval.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
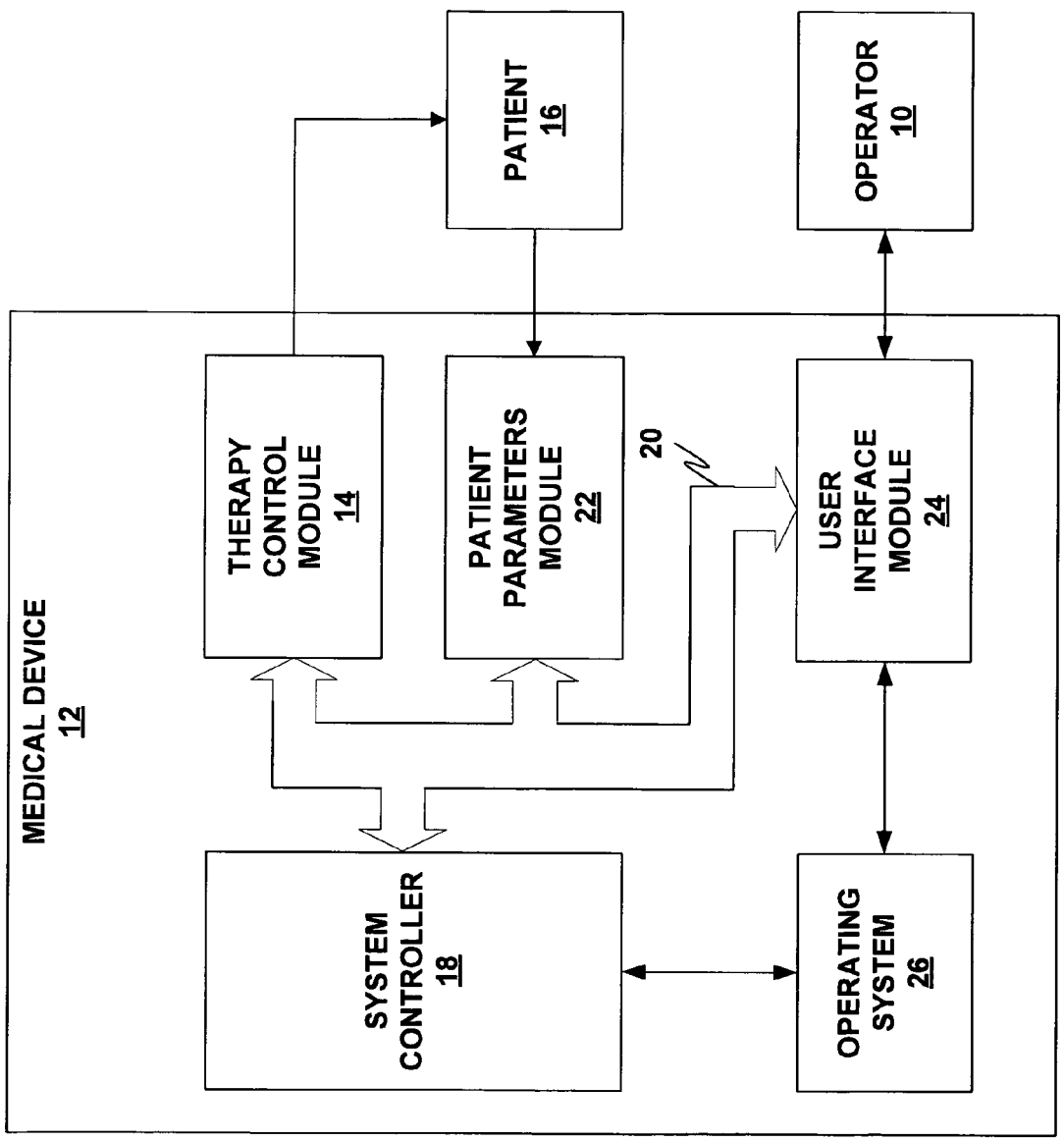
FIG. 1 is a block diagram illustrating a medical device configured according to an embodiment of the invention.

FIG. 1 is a block diagram illustrating a medical device system in which the invention may be practiced. When activated by an operator 10, a medical device 12 administers a therapy regimen to a patient 16. Medical device 12 may be implemented, for example, as an automated external defibrillator (AED) or manual defibrillator that applies electric shocks to patient 16. It will be appreciated by those skilled in the art that medical device 12 may deliver other forms of therapy.

Operation of medical device 12 is controlled by a system controller 18 that is connected to a system bus 20. System controller 18 may be implemented as a microprocessor that communicates control and data signals with other components of medical device 12 via system bus 20. These components may include functional modules, such as therapy control module 14 or other therapy modules, a patient parameters module 22, and a user interface module 24.

Therapy control module 14 causes therapy to be delivered to patient 16. For example, if medical device 12 is an AED, therapy control module 14 causes defibrillator electrodes to deliver electric shocks to patient 16 in response to control signals received from system controller 18 via system bus 20. Therapy control module 14 may include, for example, charging circuitry, a battery, and a discharge circuit. Any or all of these components can be controlled by system controller 18.

Patient parameters module 22 collects information from patient 16, including, for example, vital signs, non-invasive blood pressure (NIBP) measurements, and saturation of oxyhemoglobin ($SpO_2$) information. Other information relating to patient 16 may be collected by patient parameters module 22, including, but not limited to, EEG measurements, invasive blood pressure measurements, temperature measurements, and end tidal $CO_2$ ($ETCO_2$) information.

User interface module 24 receives input from operator 10 and outputs information to operator 10 using any of a variety of input and output devices. For example, operator 10 may use keys to input commands to medical device 12 and receive prompts or other information via a display screen or LED indicators. As an alternative, the display screen may be implemented as a touch-screen display for both input and output. In addition, user interface module 24 may print text reports or waveforms using a strip chart recorder or similar device. User interface module 24 may also interface with a rotary encoder device.

User interface module 24 provides input received from operator 10 to an operating system 26 that controls operation of medical device 12 via system controller 18. Operating system 26 may be implemented as a set of processor-readable instructions that are executed by system controller 18. When medical device 12 is activated, operating system 26 causes therapy control module 14 to deliver therapeutic shocks to patient 16 via defibrillator electrodes, for example, according to an energy protocol.

As described above, system controller 18, therapy control module 14, patient parameters module 22, and user interface module 24 are connected to each other via system bus 20. System bus 20 may be implemented using any of a number of bus architectures. For example, while not required, system bus 20 may be implemented as a USB-compatible system bus as described in pending U.S. patent application Ser. No. 09/922708, filed on Nov. 19, 2001 and hereby incorporated by reference in its entirety.

Each of therapy control module 14, system controller 18, patient parameters module 22, and user interface module 24 may incorporate a processor to govern its operations. Moreover, the operation of therapy control module 14, system controller 18, patient parameters module 22, and user interface module 24 may be governed by watchdog timers. Each watchdog timer requires a handshake at a prescribed time to validate proper operation of the processor of its associated module. The processors contain watchdog timer process managers that verify that the expected processes have performed normally by examining whether the processes have properly "checked in" during a particular time interval. If the processes have properly checked in during the prescribed time interval, a confirmation or handshake signal is output to the watchdog timer. If the watchdog timer does not detect the handshake signal within the prescribed time, the watchdog timer places the processor in a reset state to reinitialize the processor to a known safe state. In addition, the watchdog timer may inhibit therapy control module 14 from inadvertently delivering an electrical shock to the patient via defibrillator electrodes.

According to various embodiments of the invention, one or more of therapy control module 14, system controller 18, patient parameters module 22, and user interface module 24 may incorporate a windowed watchdog timer that is leveraged across several modules to control the modules. For example, as described below in connection with FIG. 2, therapy control module 14 may incorporate a windowed watchdog timer (WWDT) that is used to control the operation of system controller 18, patient parameters module 22, and user interface module 24.

Figure 2:
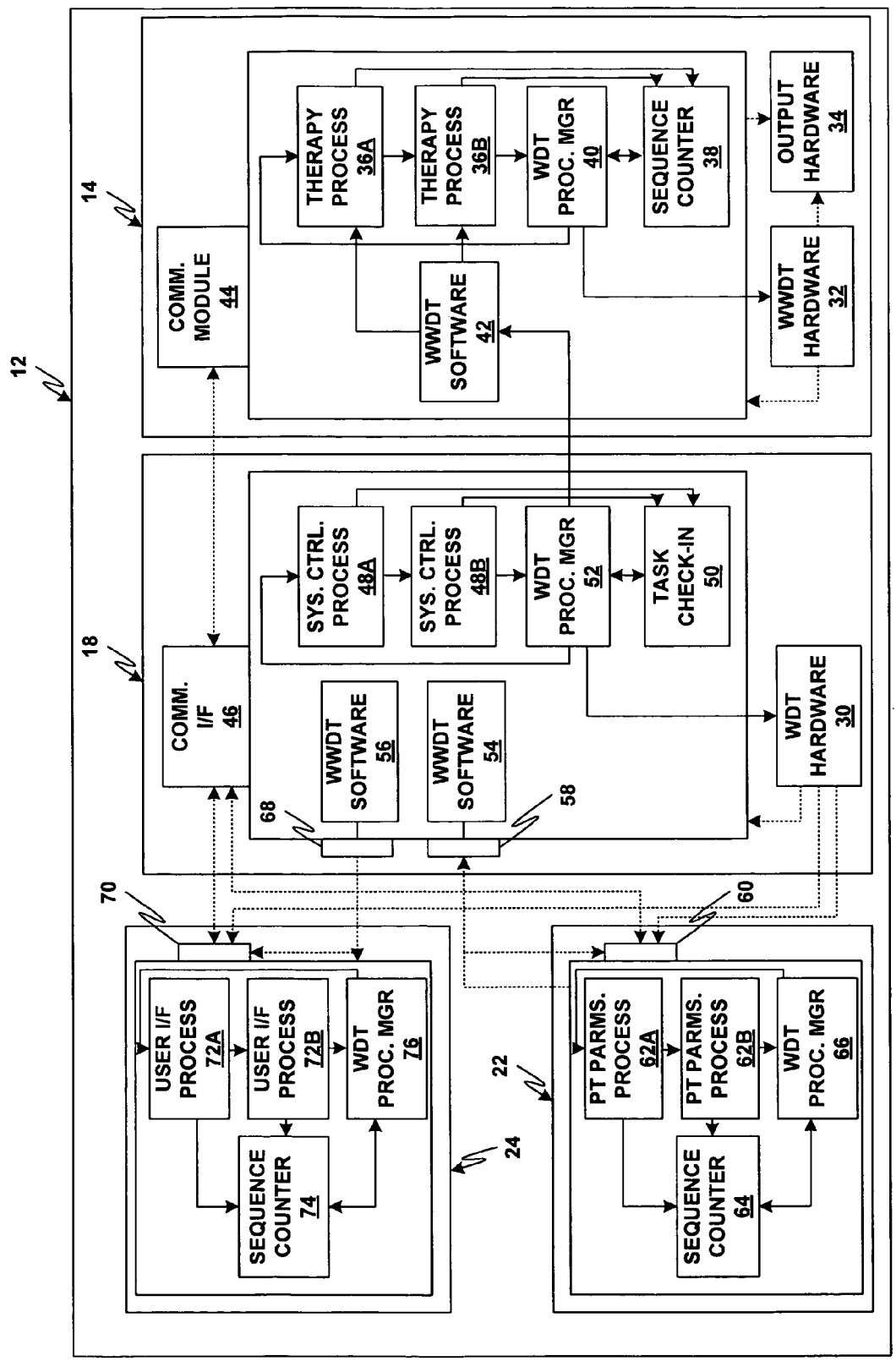
FIG. 2 is a block diagram illustrating an example implementation of a medical device.

FIG. 2 is a block diagram illustrating an example implementation of medical device 12. As depicted in FIG. 2, therapy control module 14, system controller 18, patient parameters module 22, and user interface module 24 exchange watchdog timer and reset signals with each other, e.g., via system bus 20 of FIG. 1. Paths communicating watchdog timer signals, such as handshake signals, are illustrated by solid lines, while paths communicating reset or disable signals are illustrated by broken lines.

One or more of therapy control module 14, system controller 18, patient parameters module 22, and user interface module 24 may incorporate an embedded processor. Each embedded processor incorporates watchdog timer (WDT) hardware 30 that resets the processor after a maximum elapsed time without a handshake. The embedded processor in one module, such as therapy control module 14, incorporates WWDT hardware 32 that resets a processor not only after a maximum elapsed time without a handshake, but also after receiving a handshake before a minimum elapsed time. While WWDT hardware 32 may be incorporated in any module, incorporating WWDT hardware 32 in therapy control module 14 may offer the benefit of improved safety when therapy control module 14 controls output hardware 34 that can harm patient 16 if activated inappropriately. As a particular example, incorporating WWDT hardware 32 in therapy control module 14 may be especially beneficial when output hardware 34 delivers high power defibrillation shocks.

The embedded processor in therapy control module 14 executes a number of therapy processes 36A, 36B, collectively referred to as therapy processes 36. Therapy processes 36 may include software processes that control various operational aspects of output hardware 34. For example, therapy control processes 36 may include processes that select energy dosage schedules. In some types of medical devices, therapy control processes 36 may include processes that control external pacing. Therapy control processes 36 may include more or fewer processes than are shown in FIG. 2.

As therapy processes 36 execute, therapy control module 14 increments a sequence counter 38 that counts the number of modules that check in. The embedded processor also executes a watchdog process manager 40 that periodically clears sequence counter 38 and issues a handshake signal to WWDT hardware 32 when the count is correct.

If a therapy process 36 executes abnormally, however, either watchdog process manager 40 is not executed or the module count is incorrect. If the module count is incorrect, a handshake signal is not issued. As a result, WWDT hardware 32 does not receive the handshake signal from watchdog process manager 40 within the prescribed time. WWDT hardware 32 then asserts the embedded processor reset signal in therapy control module 14. WWDT hardware 32 may also disable output hardware 34 as an added safety measure.

WWDT hardware 32 also resets the embedded processor and disables output hardware 34 if WWDT hardware 32 receives the handshake signal from watchdog process manager 40 too early, e.g., before a specified minimum count is reached. Abnormal processor operation may be indicated when a handshake signal is received either too early or too late. Thus, resetting the processor and disabling output hardware 34 when a handshake signal is received too early provides an additional safeguard against abnormal operation and, as a result, an added degree of hazard mitigation.

According to various embodiments of the invention, the safety benefits imparted by WWDT hardware 32 are leveraged across one or more embedded processors in other modules via a software-based extension technique. In particular, WWDT software 42 may receive handshakes from other modules that may or may not include watchdog timer (WDT) hardware via a handshake link. The handshake link can be implemented as a discrete signal or a message communicated via a serial or parallel bus interface and may include, for example, an intermodule communication module 44 that communicates with other modules using either a wired or a wireless link. Intermodule communication module 44 may communicate hardware reset signals with the other modules, as shown in FIG. 2, and may also communicate handshake signals.

As a particular example, therapy control module 14 may communicate via intercommunication module 44 with a communication interface 46 in system controller 18. An embedded processor in system controller 18 may execute a number of system control processes 48A, 48B, collectively referred to as system control processes 48. These processes may include, for example, updating displays or responding to a request to provide therapy. System control processes 48 may include more or fewer processes than are shown in FIG. 2.

As system control processes 48 execute, system control processes 48 check in with a task check-in module 50. The embedded processor in system controller 18 also executes a watchdog process manager 52 that periodically resets task check-in module 50 and issues handshake signals to WDT hardware 30 and to WWDT software 42 executing in therapy control module 14. As long as system control processes 48 continue to execute properly, task check-in module 50 is cleared.

If a system control process 48 executes abnormally, however, either watchdog process manager 52 is not executed or the task check-in is not cleared. If the task check-in is not cleared, a handshake signal is not issued. As a result, WDT hardware 30 and WWDT software 42 do not receive the handshake signal from watchdog process manager 52. WDT hardware 30 resets the embedded processor in system controller 18. In addition, WWDT software 42 resets therapy control module 14 if the handshake signal is received either too early or too late from watchdog process manager 52. WWDT software 42 thereby verifies the proper operation not only of therapy control module 14, but also of system controller 18. In this manner, the hazard mitigation benefits of a windowed watchdog timer may be realized in system controller 18 without incorporating a hardware-based windowed watchdog timer in system controller 18.

System controller 18 may in turn leverage the benefits of WWDT hardware 32 to patient parameters module 22 and user interface module 24 via WWDT software processes 54 and 56, respectively. For example, system controller 18 may communicate reset signals with patient parameters module 22 via a hardware interface 58 and communication interface hardware 60 in patient parameters module 22.

The embedded processor in patient parameters module 22 executes a number of patient parameters processes 62A, 62B, collectively referred to as patient parameters processes 62. Patient parameters processes 62 may include software processes that control various operational aspects of patient parameters module 22. For example, patient parameters processes 62 may include processes for collecting various types of information from patient 16, such as vital signs, non-invasive blood pressure (NIBP) measurements, and $SpO_2$ information. Patient parameters processes 62 may also include processes for collecting EEG measurements, invasive blood pressure measurements, temperature measurements, and $ETCO_2$ information. The embedded processor in patient parameters module 22 may execute more or fewer patient parameters processes 62 than are shown in FIG. 2.

As patient parameters processes 62 execute, patient parameters processes 62 increment a sequence counter 64 that counts the number of modules that check in. The embedded processor also executes a watchdog process manager 66 that periodically clears sequence counter 64 and issues a handshake signal to WWDT software 54 when the count is correct.

If a patient parameters process 62 executes abnormally, however, either watchdog process manager 66 is not executed or the module count is incorrect. If the module count is incorrect, a handshake signal is not issued. As a result, WWDT software 54 does not receive the handshake signal from watchdog process manager 66 within the prescribed time. In addition, sequence counter 64 continues to increment until the timeout count is reached. WWDT software 54 then asserts the embedded processor reset signal in patient parameters module 22, which may also be reset by WDT hardware 30. Communication interface hardware 60 may also transmit a reset signal to communication interface 46 in the embedded processor in system controller 18, thereby causing system controller 18 to reset. Communication interface 46 may in turn communicate a reset signal to intermodule communication module 44, causing therapy control module 14 to reset and disabling output hardware 34.

Similarly, system controller 18 may communicate reset signals with user interface module 24 via a hardware interface 68 and communication interface hardware 70 in user interface module 24. The embedded processor in user interface module 24 executes a number of patient parameters processes 72A, 72B, collectively referred to as user interface processes 72. User interface processes 72 may include software processes that control various operational aspects of user interface module 24. For example, user interface processes 72 may include processes for receiving input from operator 10 and presenting information to operator 10 using any of a variety of input and output devices, including but not limited to keys, a touch screen, a display screen, or LED indicators. In addition, user interface processes 72 may include processes for printing text reports or waveforms using a strip chart recorder or similar device. The embedded processor in user interface module 24 may execute more or fewer user interface processes 72 than are shown in FIG. 2.

As user interface processes 72 execute, user interface processes 72 increment a sequence counter 74 that counts the number of modules that check in. The embedded processor also executes a watchdog process manager 76 that periodically clears sequence counter 74 and issues a handshake signal to WWDT software 56 when the count is correct.

If a user interface process 72 executes abnormally, however, either watchdog process manager 76 is not executed or the module count is incorrect. If the module count is incorrect, a handshake signal is not issued. As a result, WWDT software 56 does not receive the handshake signal from watchdog process manager 76 within the prescribed time. WWDT software 56 then asserts the embedded processor reset signal in user interface module 24, which may also be reset by WDT hardware 30. While not required, communication interface hardware 70 may also transmit a reset signal to communication interface 46 in the embedded processor in system controller 18, thereby causing system controller 18 to reset. Communication interface 46 may in turn communicate a reset signal to intermodule communication module 44, causing therapy control module 14 to reset and disabling output hardware 34.

Leveraging WWDT hardware 32 across multiple embedded processors via WWDT software 42, 54, 56 enables multiple modules within medical device 12 to realize the enhanced safety benefits of a windowed watchdog timer without incorporating a hardware-based windowed watchdog timer in each embedded processor. Hardware complexity and cost may be reduced as a result.

The configuration depicted in FIG. 2 is illustrative of various embodiments of the invention. For example, FIG. 2 depicts the embedded processor in system controller 18 cascaded serially from WWDT hardware 32 by WWDT software 42. The embedded processors in patient parameters module 22 and user interface module 24 are illustrated as cascaded in parallel from the embedded processor in system controller via WWDT software 54, 56. Other configurations, however, may be implemented consistent with the principles of the invention. For instance, the embedded processors in patient parameters module 22 and user interface module 24 may be cascaded serially from the embedded processor in system controller 18. As another example, the embedded processors in system controller 18, patient parameters module 22, and user interface module 24 can all be cascaded in parallel from WWDT hardware 32. More generally, other combinations of serial- and parallel-cascaded embedded processors can be implemented consistent with the principles of the invention.

The WWDT software may be implemented as a set of computer-executable instructions stored in some form of computer readable media. Computer readable media can be any available media that can be accessed by medical device 12. By way of example, and not limitation, computer readable media may comprise computer storage media and communication media. Computer storage media includes volatile and nonvolatile, removable and nonremovable media implemented in any method or technology for storage of information, such as computer readable instructions, data structures, program modules, or other data. Computer storage media includes, but is not limited to, random access memory (RAM), read only memory (ROM), EEPROM, flash memory or other memory technology, CD-ROM, digital versatile discs (DVD) or other optical storage, magnetic cassettes, magnetic tape, magnetic disk storage or other magnetic storage devices, or any other medium that can be used to store the desired information and that can be accessed by medical device 12. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or other direct-wired connection, and wireless media, such as acoustic, RF, infrared, and other wireless media. Combinations of any of the above computer storage media and communication media are also included within the scope of computer-readable media.

Figure 3:
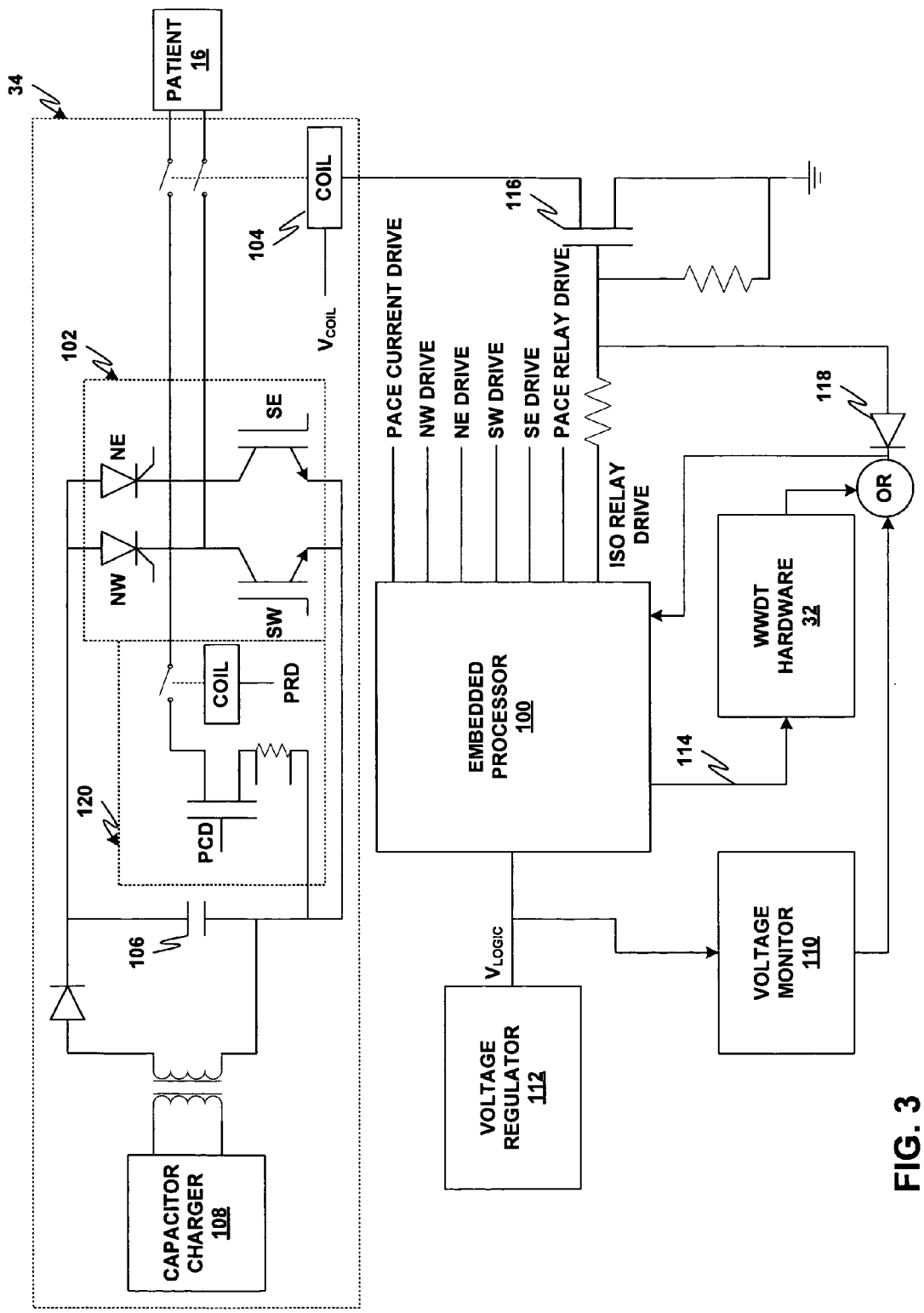
FIG. 3 is a block diagram illustrating an example implementation of a therapy control module.

FIG. 3 is a block diagram illustrating an example embodiment of therapy control module 14. The hardware configuration shown in FIG. 3 implements the WWDT functionality described above in connection with FIG. 2 and implements an additional measure of hazard mitigation by using a regulated voltage monitor to inhibit an abnormally operating processor from activating output hardware 34.

As depicted in FIG. 3, an embedded processor 100 controls an energy shaping circuit 102 via NW, NE, SW, and SE drive lines and an isolation relay 104 via an isolation relay drive line. While not shown in FIG. 3, isolation relay 104 may be incorporated as part of energy shaping circuit 102. To deliver a defibrillation shock, embedded processor 100 first charges a capacitor 106 using a capacitor charger 108, then activates isolation relay 104 and energy shaping circuit 102 to deliver the shock to patient 16. A similar process may be used to deliver a pacing pulse to patient 16. As shown in FIG. 3, for example, embedded processor 100 may control a pacing current drive circuit 120.

When capacitor 106 is charged to a non-zero voltage, loss of power or abnormal operation of embedded processor 100 may cause the drive lines of embedded processor 100 to change state. Isolation relay 104 and energy shaping circuit 102 may be inadvertently activated as a result, thereby delivering a shock to patient 16.

To reduce the risk of inappropriate delivery of a shock to patient 16, a voltage monitor 110 monitors an output $V_{LOGIC}$ of a voltage regulator 112. If voltage monitor 110 detects a loss of power or any unexpected voltage, voltage monitor 110 generates a reset signal. A reset signal is also generated by WWDT hardware 32 if WWDT hardware 32 receives an early or late watchdog signal from embedded processor 100 on a line 114.

When either voltage monitor 110 or WWDT hardware 32 generates a reset signal, embedded processor 100 is reset and isolation relay 104 is prevented being driven to the "on" state. The reset signals generated by voltage monitor 110 and WWDT hardware 32 may be provided to an OR gate, as shown in FIG. 3, such that either reset signal will reset embedded processor 100 and inhibit isolation relay 104. A diode 118 prevents the reset outputs of voltage monitor 110 and WWDT hardware 32 from inadvertently activating isolation relay drive transistor 116.

Various embodiments of the invention have been described. The invention may be used in AEDs as well as other types of defibrillators. In addition, while several embodiments of the invention have been described in the context of a defibrillator, the principles of the invention may be practiced in other types of medical devices, including, but not limited to, defibrillator/pacemakers and therapy devices for other medical conditions, such as stroke and respiratory conditions. These and other embodiments are within the scope of the following claims.

The invention claimed is:

1. A method comprising:
generating a handshake signal in a first processor of a first functional module of a medical device;
providing the handshake signal to a watchdog timer software process in a second processor of a second functional module of the medical device, wherein the watchdog timer software process corresponds to a watchdog timer hardware unit;
receiving a reset signal from the second processor to reset the first processor when the handshake signal is not provided to the watchdog timer software process within a prescribed time interval; and
receiving a reset signal from the watchdog timer software process to reset the second processor when the handshake signal is not provided to the watchdog timer software process within the prescribed time interval.

2. The method of claim 1, further comprising resetting the first processor and the second processor when the handshake signal is provided before a minimum time or after a maximum time.

3. The method of claim 1, further comprising disabling therapy output hardware when the handshake signal is not provided within the prescribed time interval.

4. The method of claim 1, further comprising detecting a voltage of the medical device, and selectively disabling therapy output hardware as a function of the detected voltage.

5. The method of claim 1, wherein the medical device is an external defibrillator comprising at least one of a therapy control module, a system controller, a user interface module, and a patient parameters module.

6. The method of claim 5, wherein the patient parameters module is configured to obtain at least one of ECG information, vital sign measurements, non-invasive blood pressure (NIBP) measurements, and $SpO_2$ information from a patient.

7. The method of claim 1, further comprising:
generating another handshake signal in a third processor;
providing the another handshake signal to another watchdog timer software process included in the first processor, wherein the another watchdog timer software process corresponds to the watchdog timer hardware unit; and
receiving a reset signal from the first processor to reset the third processor when the another handshake signal is not provided to the another watchdog timer software process within a prescribed time interval.

8. The method of claim 1, further comprising:
generating another handshake signal in a third processor;
providing the another handshake signal to the watchdog timer software process included in the second processor; and
receiving a reset signal from the second processor to reset the third processor when the another handshake signal is not provided to the watchdog timer software process within a prescribed time interval.

9. The method of claim 1, further comprising:
generating another handshake signal in the second processor;
providing the another handshake signal to the watchdog timer hardware unit; and
receiving a reset signal from the watchdog timer hardware unit to reset the second processor when the another handshake signal is not provided to the watchdog timer hardware unit within a prescribed time interval.

10. A processor-readable computer storage medium containing processor-executable instructions to cause a processor to:
generate a handshake signal in a first processor of a first functional module of a medical device;
provide the handshake signal to a watchdog timer software process in a second processor of a second functional module of the medical device, wherein the watchdog timer software process corresponds to a watchdog timer hardware unit;
receive a reset signal from the second processor to reset the first processor when the handshake signal is not provided to the watchdog timer software process within a prescribed time interval; and
receive a reset signal from the watchdog timer software process to rest the second processor when the handshake signal is not provided to the watchdog timer software process within the prescribed time interval.

11. The processor-readable computer storage medium of claim 10, further containing instructions for resetting the first processor and the second processor when the handshake signal is provided before a minimum time or after a maximum time.

12. The processor-readable computer storage medium of claim 10, further containing instructions for disabling therapy output hardware when the handshake signal is not provided within the prescribed time interval.

13. The processor-readable computer storage medium of claim 10, further containing instructions for detecting a voltage of the medical device, and selectively disabling therapy output hardware as a function of the detected voltage.

14. The processor-readable computer storage medium of claim 10, wherein the medical device is an external defibrillator comprising at least one of a therapy control module, a system controller, a user interface module, and a patient parameters module.

15. The processor-readable computer storage medium of claim 14, wherein the patient parameters module is configured to obtain at least one of ECG information, vital sign measurements, non-invasive blood pressure (NIBP) measurements, and $SpO_2$ information from a patient.

16. The processor-readable medium of claim 10, further containing instructions for:
generating another handshake signal in a third processor;
providing the another handshake signal to another watchdog timer software process included in the first processor, wherein the another watchdog timer software process corresponds to the watchdog timer hardware unit; and
receiving a reset signal from the first processor to reset the third processor when the another handshake signal is not provided to the another watchdog timer software process within a prescribed time interval.

17. A medical device comprising:
a watchdog timer hardware unit;
a first embedded processor included in a first functional module, configured to generate a handshake signal; and
a second embedded processor included in a second functional module, with a watchdog timer software process corresponding to the watchdog timer hardware unit, wherein the watchdog timer software process is configured to receive the handshake signal and to reset the first embedded processor and the second embedded processor when the handshake signal is not provided to the watchdog timer software process within a prescribed time interval.

18. The medical device of claim 17, wherein the watchdog timer hardware unit is a windowed watchdog timer hardware unit.

19. The medical device of claim 17, wherein at least one of the first and second embedded processors are configured to reset when the handshake signal is provided before a minimum time or after a maximum time.

20. The medical device of claim 17, further comprising therapy output hardware, wherein at least one of the first and second embedded processors is configured to disable the therapy output hardware when the handshake signal is not provided within the prescribed time interval.

21. The medical device of claim 17, further comprising a voltage monitor configured to detect a voltage of the medical device, wherein the voltage monitor is further configured to selectively disable therapy output hardware as a function of the detected voltage.

22. The medical device of claim 17, wherein the medical device comprises at least one of a therapy control module, a system controller, a user interface module, and a patient parameters module.

23. The medical device of claim 22, wherein the patient parameters module is configured to obtain at least one of ECG information, vital sign measurements, non-invasive blood pressure (NIBP) measurements, and $SpO_2$ information from a patient.

24. The medical device of claim 17, wherein the watchdog timer hardware unit comprises a hardware unit in the second functional module.

25. The medical device of claim 17, further comprising a third functional module including a third embedded processor configured to generate another handshake signal, wherein the first embedded processor includes another watchdog timer software process corresponding to the watchdog timer hardware unit to receive the another handshake signal and to reset the third embedded processor when the handshake signal is not provided within a prescribed time interval.

26. The medical device of claim 17, further comprising a third functional module including a third embedded processor configured to generate another handshake signal, wherein the watchdog timer software process in the second embedded processor receives the another handshake signal and resets the third embedded processor when the another handshake signal is not provided within a prescribed time interval.

27. The medical device of claim 17, wherein the second embedded processor is configured to generate another handshake signal and the watchdog timer hardware unit receives the another handshake signal and resets the second embedded processor when the another handshake signal is not provided within a prescribed time interval.

* * * * *

UNITED STATES PATENT AND TRADEMARK OFFICE
CERTIFICATE OF CORRECTION

| | | |
|---|---|---|
| PATENT NO. | : 7,356,740 B2 | Page 1 of 1 |
| APPLICATION NO. | : 11/251716 | |
| DATED | : April 8, 2008 | |
| INVENTOR(S) | : James S. Neumiller et al. | |

It is certified that error appears in the above-identified patent and that said Letters Patent is hereby corrected as shown below:

In column 10, line 16, in Claim 10, delete "rest" and insert -- reset --, therefor.

Signed and Sealed this

Sixth Day of October, 2009

David J. Kappos
*Director of the United States Patent and Trademark Office*